US006969503B2

(12) United States Patent
Yanagisawa et al.

(10) Patent No.: US 6,969,503 B2
(45) Date of Patent: Nov. 29, 2005

(54) VAPOR GROWN CARBON FIBER AND ELECTRODE MATERIAL FOR BATTERY

(75) Inventors: Takashi Yanagisawa, Tokyo (JP); Shunji Higaki, Nagareyama (JP)

(73) Assignee: GSI Creos Corporation, Tokyo (JP)

( * ) Notice: Subject to any disclaimer, the term of this patent is extended or adjusted under 35 U.S.C. 154(b) by 503 days.

(21) Appl. No.: 10/098,351

(22) Filed: Mar. 18, 2002

(65) Prior Publication Data

US 2003/0044602 A1    Mar. 6, 2003

(30) Foreign Application Priority Data

Aug. 29, 2001  (JP) .............................. 2001-260493
Aug. 30, 2001  (JP) .............................. 2001-262249
Feb. 15, 2002  (JP) .............................. 2002-038769

(51) Int. Cl.$^7$ ............................................... D01F 9/12
(52) U.S. Cl. .............................. 423/447.2; 423/447.1; 423/447.3; 423/445 R; 428/367
(58) Field of Search .......................... 423/447.1, 447.2, 423/447.3, 445 R; 428/367

(56) References Cited

U.S. PATENT DOCUMENTS 6,471,936 B1 * 10/2002 Chen et al. ............... 423/658.2
6,812,634 B2 * 11/2004 Murakami et al. .......... 313/495

FOREIGN PATENT DOCUMENTS

| EP | 0 198 558 A2 | 10/1986 |
| EP | 1 122 344 A2 | 8/2001 |
| WO | WO 95/07551 | 3/1995 |

OTHER PUBLICATIONS

Terrones et al., "Graphitic cones in palladium catalysed carbon nanofibres", Chemical Physics Letters, Elsevier Science Ltd., 343, pp. 241-250, 2001.

Endo et al., "Pyrolytic Carbon Nanotubes From Vapor-grown Carbon Fibers", Carbon, Elsevier Science Ltd., vol. 33, No. 7, pp. 873-881, 1995.

Endo et al., "Vapor-grown carbon fibers (VGCFs) Basic properties and their battery applications", Carbon, Elsevier Science Ltd., 39, pp. 1287-1297, 2001.

Endo et al., "Recent development of carbon materials for Li ion batteries", Carbon, Elsevier Science Ltd., 38, pp. 183-197, 2000.

Flandrois et al., "Carbon materials for lithium-ion rechargeable batteries", Carbon, Elsevier Science Ltd., 37, pp. 165-180, 1999.

(Continued)

*Primary Examiner*—Stanley S. Silverman
*Assistant Examiner*—Peter J. Lish
(74) *Attorney, Agent, or Firm*—Oliff & Berridge, PLC

(57) ABSTRACT

A carbon fiber has a coaxial stacking morphology of truncated conical tubular graphene layers, wherein each of the graphene layers includes a hexagonal carbon layer and has a large ring end at one end and a small ring end at the other end in the axial direction. When the carbon fiber is subjected to a heat treatment in a non-oxidizing atmosphere, the large ring ends of each two of the hexagonal carbon layers are linked by layer link sections in at least one of groups of the hexagonal carbon layers arranged in an axial direction, and an outer surface is closed to have a multi-semiring structure in cross section. When the carbon fiber is then subjected to a heat treatment in an oxidizing atmosphere, the layer link sections are released, whereby the edges of the hexagonal carbon layers are exposed at the large ring ends in a regularly arranged manner.

8 Claims, 16 Drawing Sheets

OTHER PUBLICATIONS

Endo et al., "Structural characterization of cup-stacked-type nanofibers with an entirely hollow core", Applied Physics Letters, vol. 80, no. 7, Feb. 18, 2002, pp. 1267-1269.

Kim et al., "Effect of ball milling on morphology of cup-stacked carbon nanotubes", Chemical Physics Letters, Apr. 2, 2002.

U.S. Appl. No. 10/098,375, filed Mar. 18, 2002, Yanagisawa et al.

U.S. Appl. No. 10/098,416, filed Mar. 18, 2002, Yanagisawa et al.

U.S. Appl. No. 10/098,396, filed Mar. 18, 2002, Yanagisawa et al.

U.S. Appl. No. 10/098,461, filed Mar. 18, 2002, Yanagisawa et al.

U.S. Appl. No. 10/098,440, filed Mar. 18, 2002, Yanagisawa et al.

U.S. Appl. No. 10/098,103, filed Mar. 18, 2002, Yanagisawa et al.

U.S. Appl. No. 10/098,522, filed Mar. 18, 2002, Yanagisawa et al.

U.S. Appl. No. 10/098,379, filed Mar. 18, 2002, Yanagisawa et al.

U.S. Appl. No. 10/098,312, filed Mar. 18, 2002, Yanagisawa et al.

U.S. Appl. No. 10/098,570, filed Mar. 18, 2002, Yanagisawa et al.

* cited by examiner 12    10

VAPOR GROWN CARBON FIBER AND ELECTRODE MATERIAL FOR BATTERY

Japanese Patent Application No. 2001-260493 filed on Aug. 29, 2001, Japanese Patent Application No. 2001-262249 filed on Aug. 30, 2001 and Japanese Patent Application No. 2002-38769 filed on Feb. 15, 2002, are hereby incorporated by in their entirety.

BACKGROUND OF THE INVENTION

The present invention relates to a carbon fiber, an electrode material for a battery, and a method of manufacturing the carbon fiber.

A vapor-grown carbon fiber is known in the art.

This carbon fiber is a short fiber in which carbon obtained by pyrolysis of hydrocarbons such as benzene or methane at a temperature of about 700° C. to 1000° C. is grown with a catalyst particle such as an ultra-fine iron particle or nickel as a nucleus.

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at a specific angle.

Carbon fibers are often mixed with resins or the like and used as composites. However, carbon fibers generally have poor adhesion to resins.

This is because carbon fibers have a lower degree of surface activity since the hexagonal carbon layers (AB planes) are exposed on the inner and outer surfaces. Moreover, a thin deposited layer in which an excess amount of insufficiently crystallized amorphous carbon is deposited is inevitably formed on the surface of carbon fibers manufactured using a vapor growth process. This deposited layer also has a lower degree of activity, thereby resulting in poor adhesion to the resins.

BRIEF SUMMARY OF THE INVENTION

The present invention may provide a carbon fiber of which the degree of activity can be adjusted, an electrode material, and a method of manufacturing the carbon fiber.

In order to achieve the above problems, one aspect of the present invention provides a raw material for a carbon fiber comprising a coaxial stacking morphology of truncated conical tubular graphene layers, wherein each of the truncated conical tubular graphene layers includes a hexagonal carbon layer.

In other words, this carbon fiber has a cup-stacked structure or lampshade-stacked structure in which a number of hexagonal carbon layers in the shape of a cup having no bottom are stacked. The coaxial stacking morphology of the truncated conical tubular graphene layers may have a shape of a hollow core with no bridge. In this structure, each of the truncated conical tubular graphene layers has a large ring end at one end and a small ring end at the other end in an axial direction, and edges of the hexagonal carbon layers are exposed at the large ring ends on an outer surface and the small ring ends on an inner surface. In other words, the edges of the tilted hexagonal carbon layers of the herring-bone structure are exposed in layers.

In an ordinary carbon fiber with a herring-bone structure, a number of hexagonal carbon layers in the shape of a cup having a bottom are stacked. However, the raw material for the carbon fiber according to the one aspect of the present invention has a hollow structure with no bridge and has a length ranging from several tens of nanometers to several tens of microns. An electrolyte can be introduced into the hollow portion and held therein.

In the carbon fiber according to the one aspect of the present invention, groups of the hexagonal carbon layers are arranged in the axial direction, and the large ring ends of each two of the hexagonal carbon layers are linked by layer link sections in at least one of the groups, whereby an outer surface is closed and has a multi-semiring structure in cross section.

The number of the hexagonal carbon layers included in the one group may be about ten. The layer link sections may include pentagonal carbon layers.

Edges of the hexagonal carbon layers may be exposed at the large ring ends in at least another one of the groups. Edges of the hexagonal carbon layers may be exposed at the small ring ends in at least one of the groups. The small ring ends of each two of the hexagonal carbon layers may be linked by layer link sections in at least one of the groups, whereby an inner surface may be closed and may have a multi-semiring structure in cross section.

The layer link sections may be formed by subjecting the carbon fiber to be the raw material to a heat treatment in a non-oxidizing atmosphere (first heat treatment). The layer link sections may be removed by subjecting the carbon fiber to a heat treatment in an oxidizing atmosphere (second heat treatment) after the first heat treatment so that the edges of the hexagonal carbon layers may be exposed at at least one of the large ring ends and small ring ends.

The above carbon fiber may be used as an electrode material for a battery.

DETAILED DESCRIPTION OF THE EMBODIMENT

One embodiment of the present invention is described below in detail with reference to the drawings.

A vapor grown carbon fiber according to the present invention has a structure in which hexagonal carbon layers in the shape of a cup having no bottom are stacked (hereinafter called "carbon fiber having a herring-bone structure").

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at a specific angle.

In an ordinary carbon fiber with a herring-bone structure, a number of hexagonal carbon layers in the shape of a cup having a bottom are stacked. However, the vapor-grown carbon fiber according to one embodiment of the present invention has a structure in which a number of hexagonal carbon layers in the shape of a bottomless cup are stacked (this bottomless carbon fiber is hereinafter called "carbon fiber having a herringbone structure").

Figure 16:
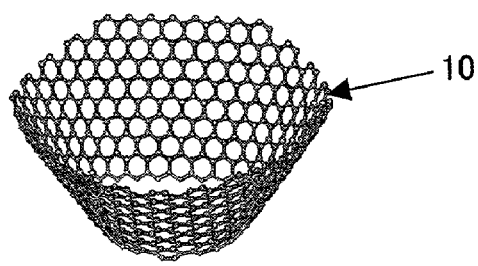
FIG. 16 is a computer graphic showing a hexagonal carbon layer, which is a unit of the coaxial stacking morphology of the truncated conical tubular graphene layers shown in FIG. 15, based on rigorous quantum theoretical calculation.
Figure 15:
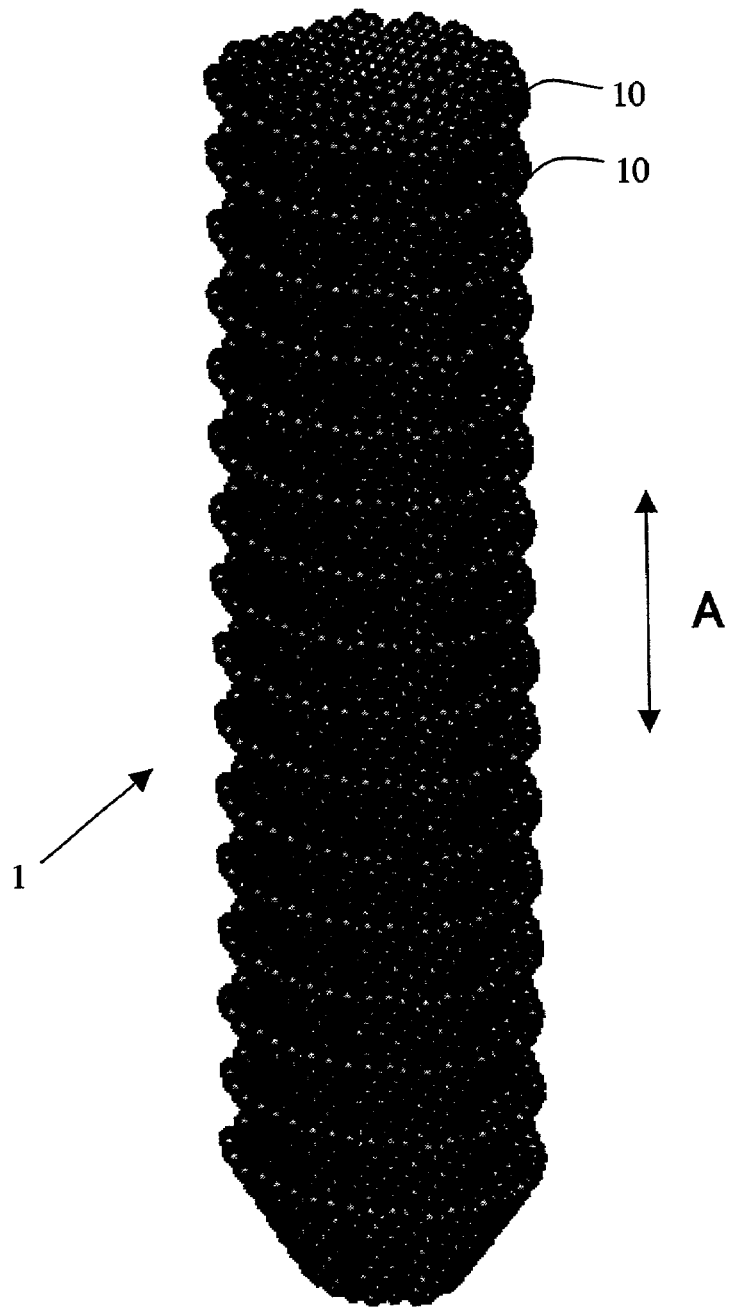
FIG. 15 is a computer graphic showing a coaxial stacking morphology of truncated conical tubular graphene layers based on rigorous quantum theoretical calculation.
Figure 17:
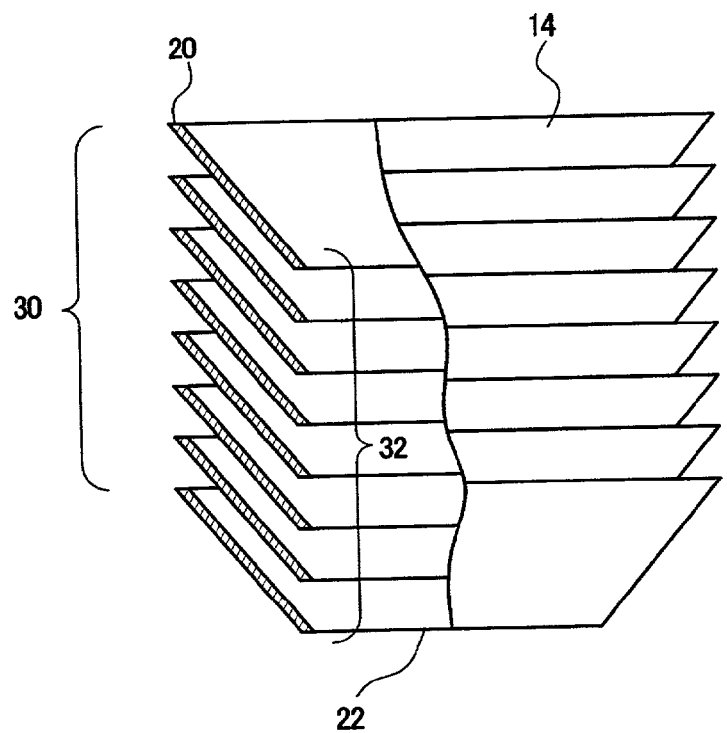
FIG. 17 is a schematic view of a large ring end and a small ring end respectively forming an outer surface and an inner surface of the coaxial stacking morphology of truncated conical tubular graphene layers.

Specifically, this carbon fiber 1 has a coaxial stacking morphology of truncated conical tubular graphene layers shown by a computer graphic in FIG. 15. Each of the truncated conical tubular graphene layers is formed of a hexagonal carbon layer 10 as shown in FIG. 16. Although the actual hexagonal carbon layers are stacked densely in an axial direction A, they are stacked roughly in FIG. 15 for convenience of description.

FIG. 16 is a schematic view of FIG. 15. Each of the hexagonal carbon layers 10 has a large ring end 20 and a small ring end 22 at opposite ends in the axial direction. The large ring ends 20 are stacked in the axial direction A to form an outer surface 30 of the carbon fiber 1. The small ring ends 22 are stacked in the axial direction A to form an inner surface 32 of the carbon fiber 1. The carbon fiber 1 is thus in the shape of a hollow core with no bridge and has a center hole 14.

An example of a method of manufacturing the carbon fiber 1 shown in FIG. 15 is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3\times10^{-7}$ mol/s. The reaction temperature and the reaction time were about 1100° C. and about 20 minutes, respectively. As a result, a carbon fiber having a herring-bone structure with an average diameter of about 100 nm was obtained. A hollow carbon fiber having no bridge at a length ranging from several tens of nanometers to several tens of microns, in which a number of hexagonal carbon layers in the shape of a bottomless cup are stacked, is obtained by adjusting the flow rate of the raw material and the reaction temperature (which are changed depending on the size of the reactor).

In the present embodiment, the carbon fiber in which a number of hexagonal carbon layers in the shape of a bottomless cup are stacked is adjusted to a carbon fiber product in which one to several hundreds of hexagonal carbon layers in the shape of a bottomless cup are stacked by grinding as described later. The carbon fiber may be adjusted to a carbon fiber product with a desired length in which several thousands to several ten thousands of hexagonal carbon layers are stacked.

Characteristics of the carbon fiber are described below.

Figure 1:
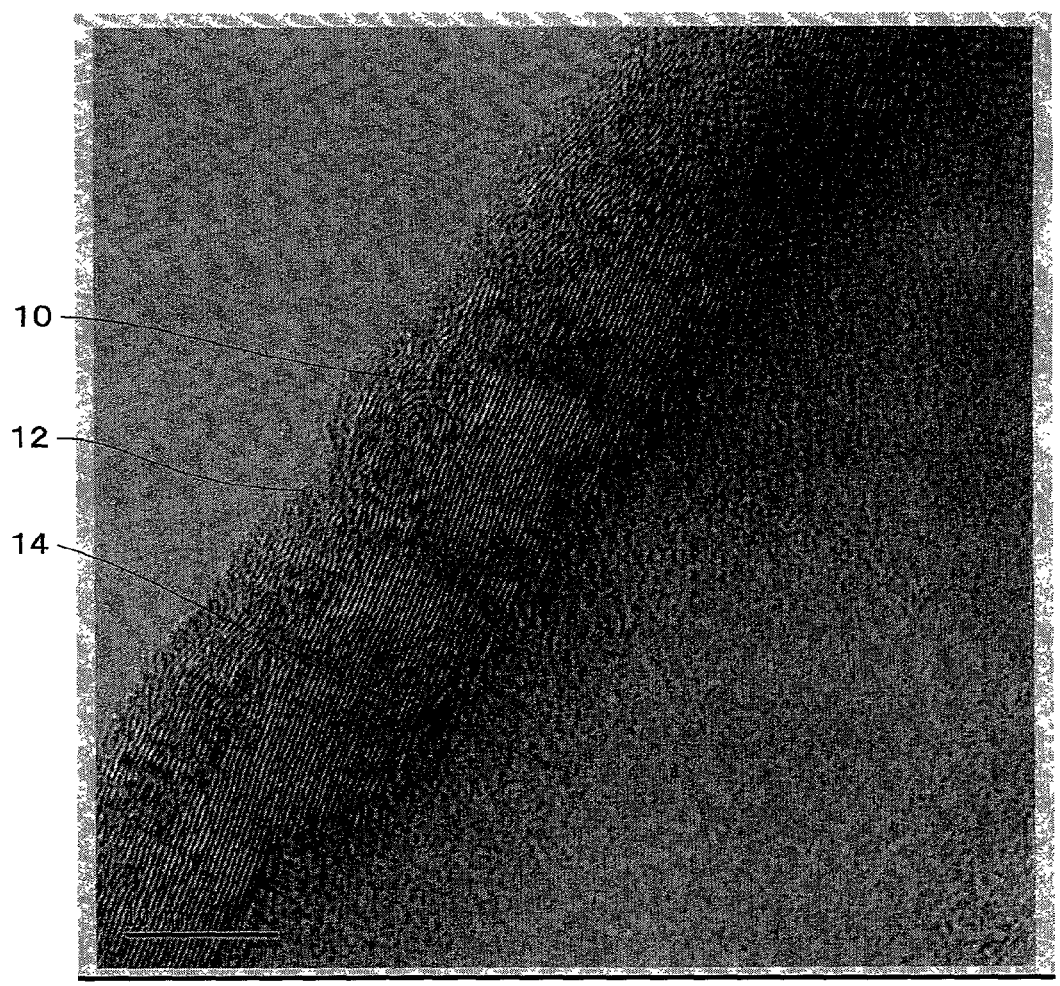
FIG. 1 is a copy of a transmission electron micrograph showing a carbon fiber having a herring-bone structure manufactured using a vapor growth process.
Figure 2:
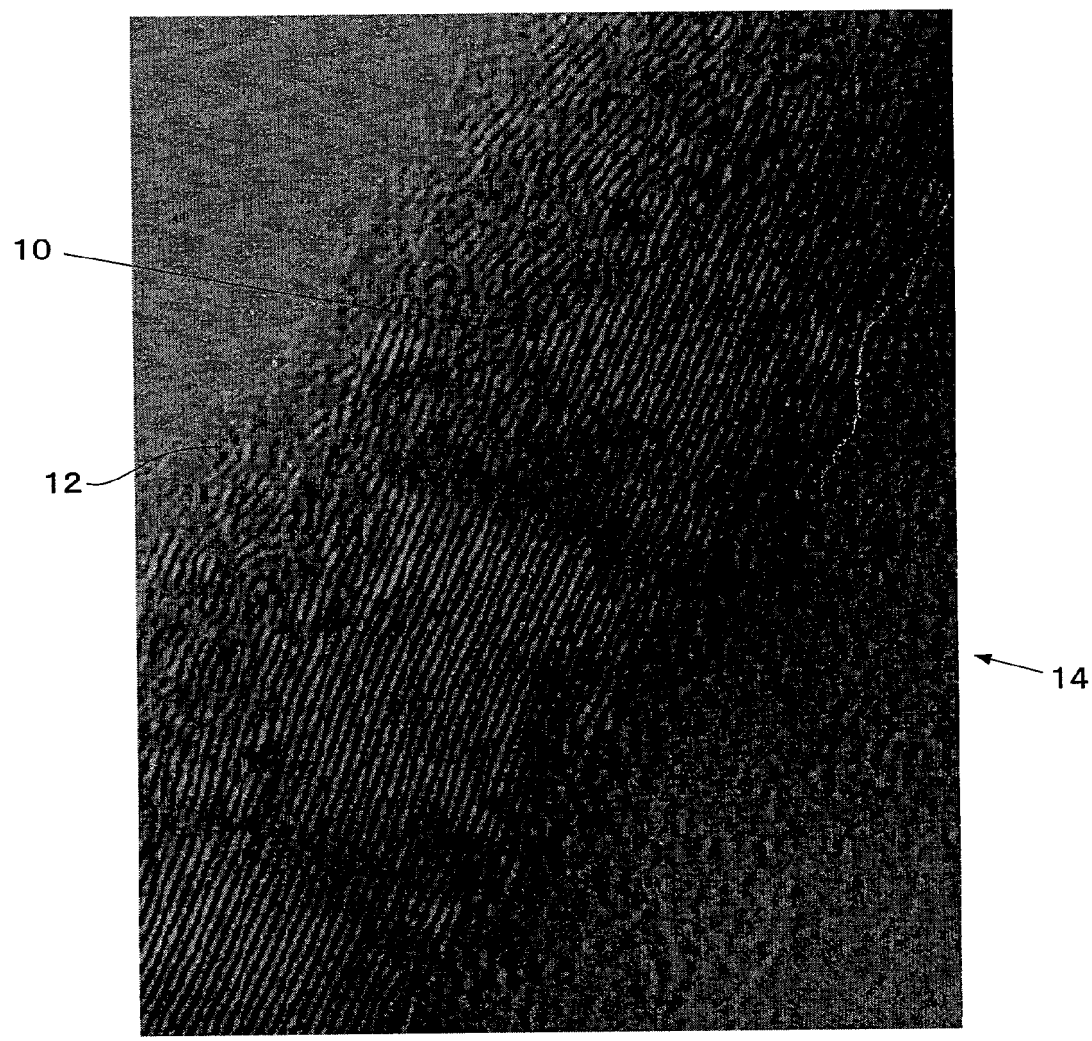
FIG. 2 is a copy of an enlarged micrograph of FIG. 1.
Figure 3:
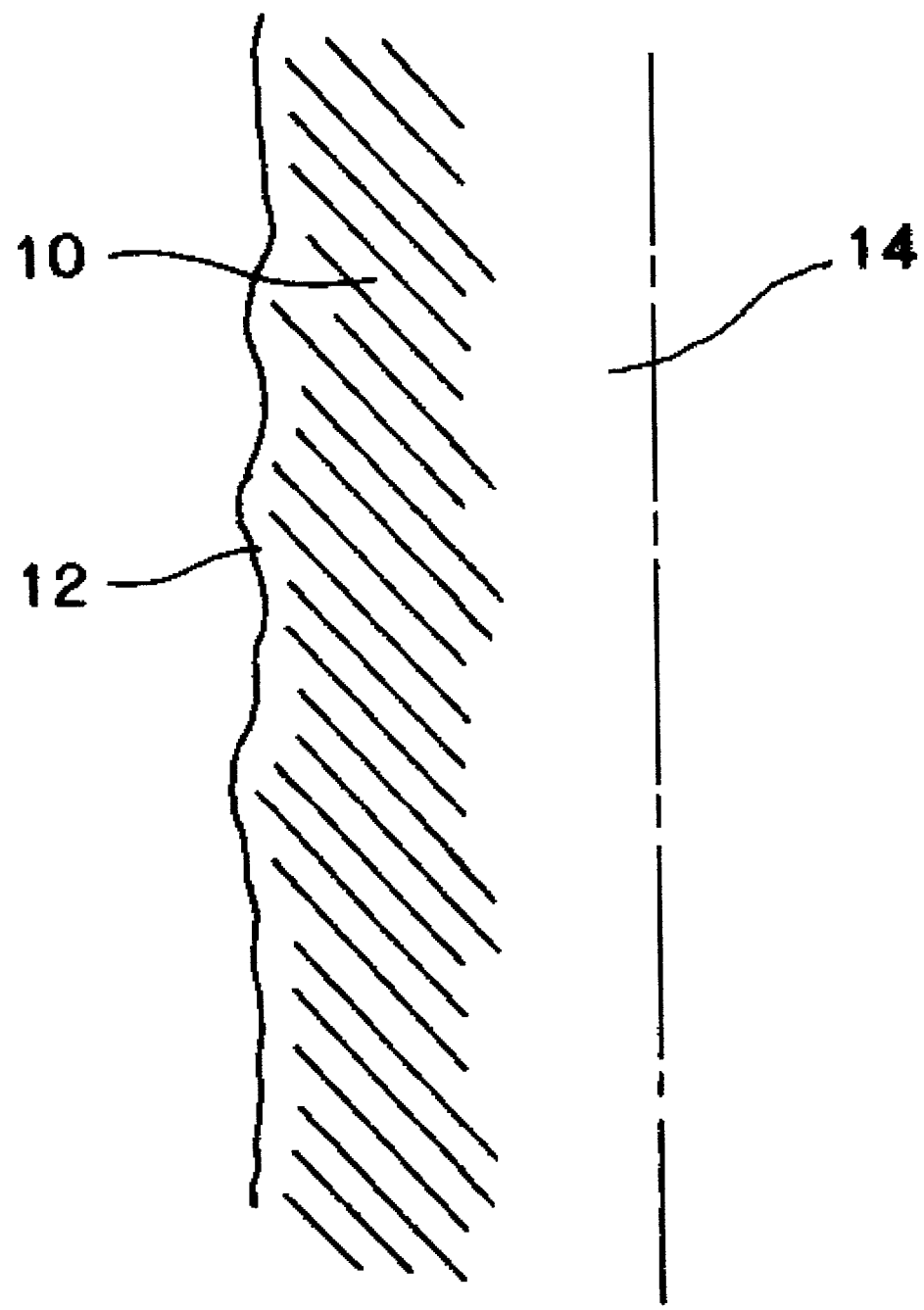
FIG. 3 is a schematic view of FIG. 2.

FIG. 1 is a copy of a transmission electron micrograph showing the carbon fiber having a herring-bone structure manufactured using the vapor growth process. FIG. 2 is a copy of an enlarged micrograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. A reference numeral 14 indicates the center hole.

Figure 18:
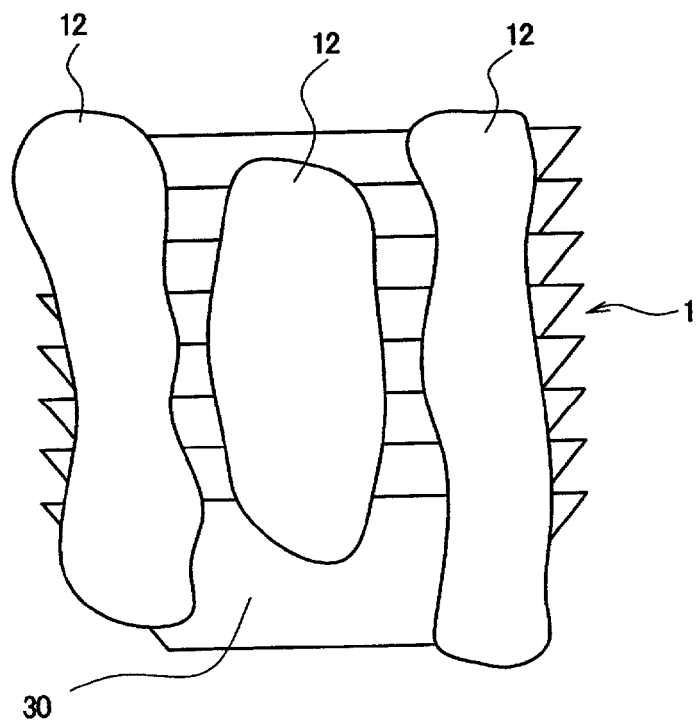
FIG. 18 is a schematic view of a deposited film of pyrolytic carbon formed over a wide range of an outer surface of a carbon fiber.

FIG. 18 is a schematic view showing a state in which the deposited films 12 are formed over a wide area of the outer surface 30 of the carbon fiber 1. As shown in FIG. 18, the hexagonal carbon layers 10 are exposed on the large ring ends 20 in the areas in which the outer surface of the carbon fiber 1 is not covered with the deposited films 12. These areas have a high degree of activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520 to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
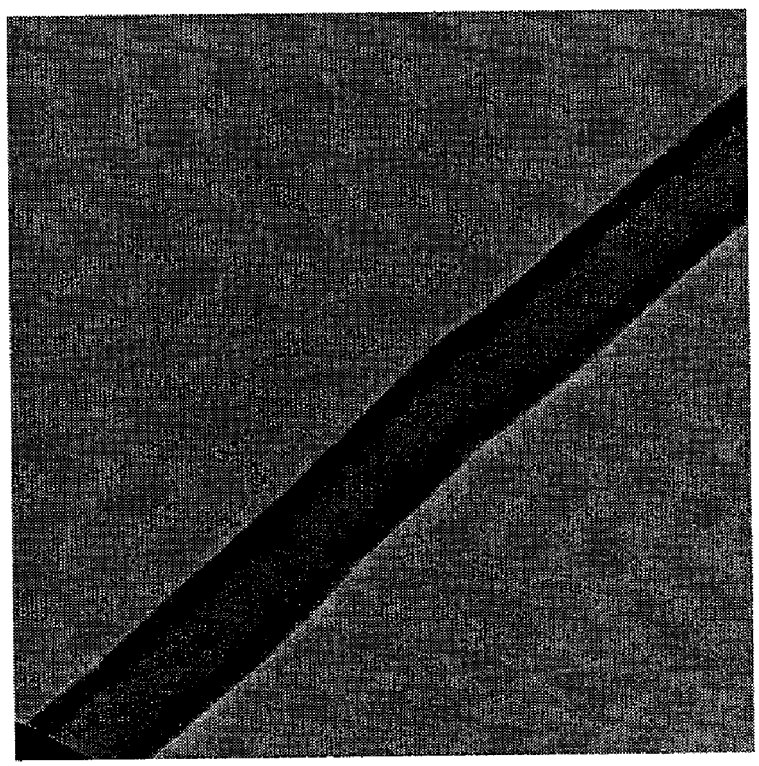
FIG. 4 is a copy of a transmission electron micrograph showing a carbon fiber having a herring-bone structure heated at a temperature of about 530° C. for one hour in air.
Figure 5:
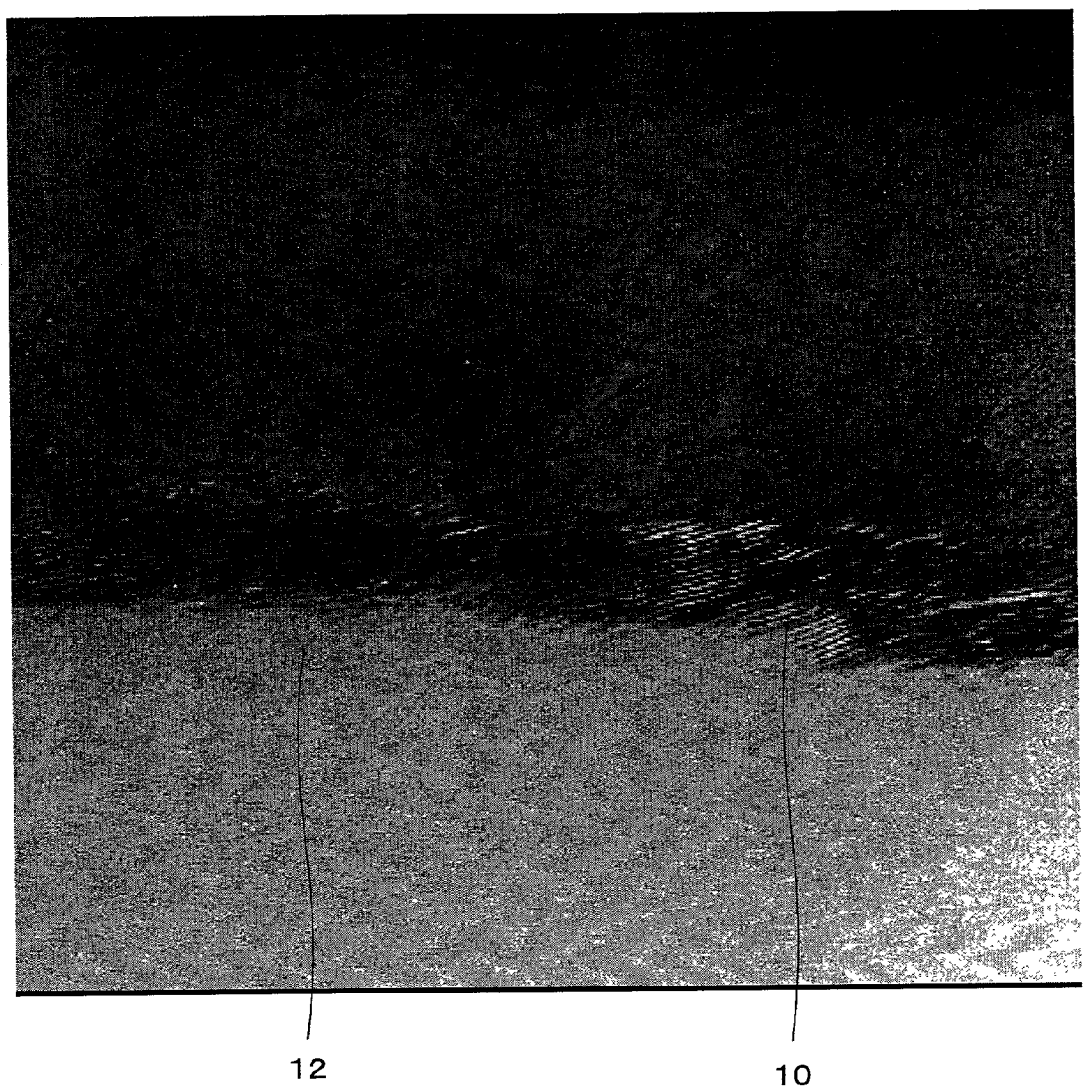
FIG. 5 is a copy of an enlarged micrograph of FIG. 4.

FIG. 4 is a copy of a transmission electron micrograph showing the carbon fiber having a herring-bone structure heated at a temperature of about 530° C. for one hour in air. FIG. 5 is a copy of an enlarged micrograph of FIG. 4, FIG. 6 is a copy of an enlarged micrograph of FIG. 5, and FIG. 7 is a schematic view of FIG. 6.

Figure 6:
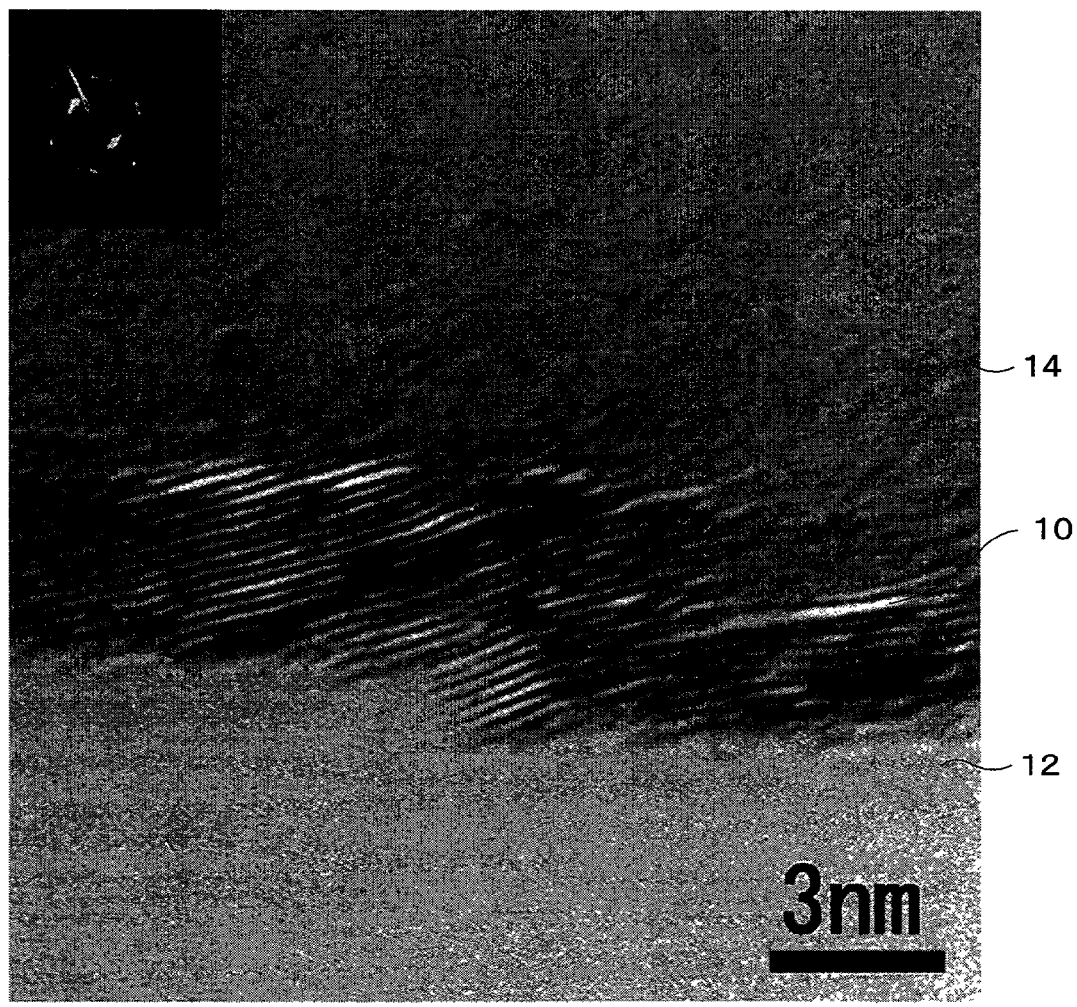
FIG. 6 is a copy of a further enlarged micrograph of FIG. 5.
Figure 7:
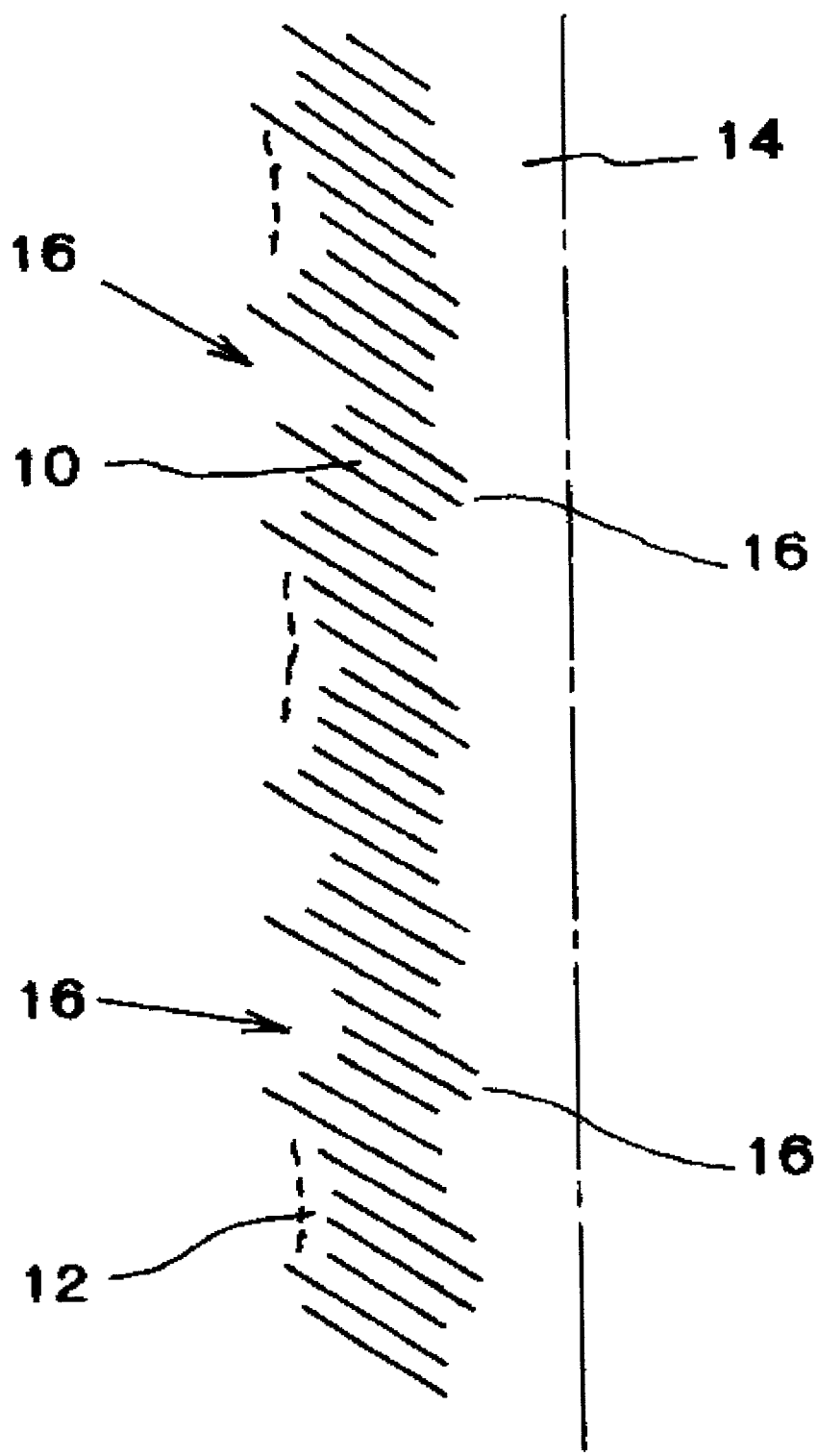
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 1 in which a number of hexagonal carbon layers 10 in the shape of a bottomless cup are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level of atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high degree of activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group, to be increased on the exposed edges of the hexagonal carbon layers 10. These functional groups containing oxygen have high hydrophilicity and high affinity to various types of substances.

In addition, the hollow structure and the irregularities 16 contribute to the anchor effect to a large extent.

Figure 8:
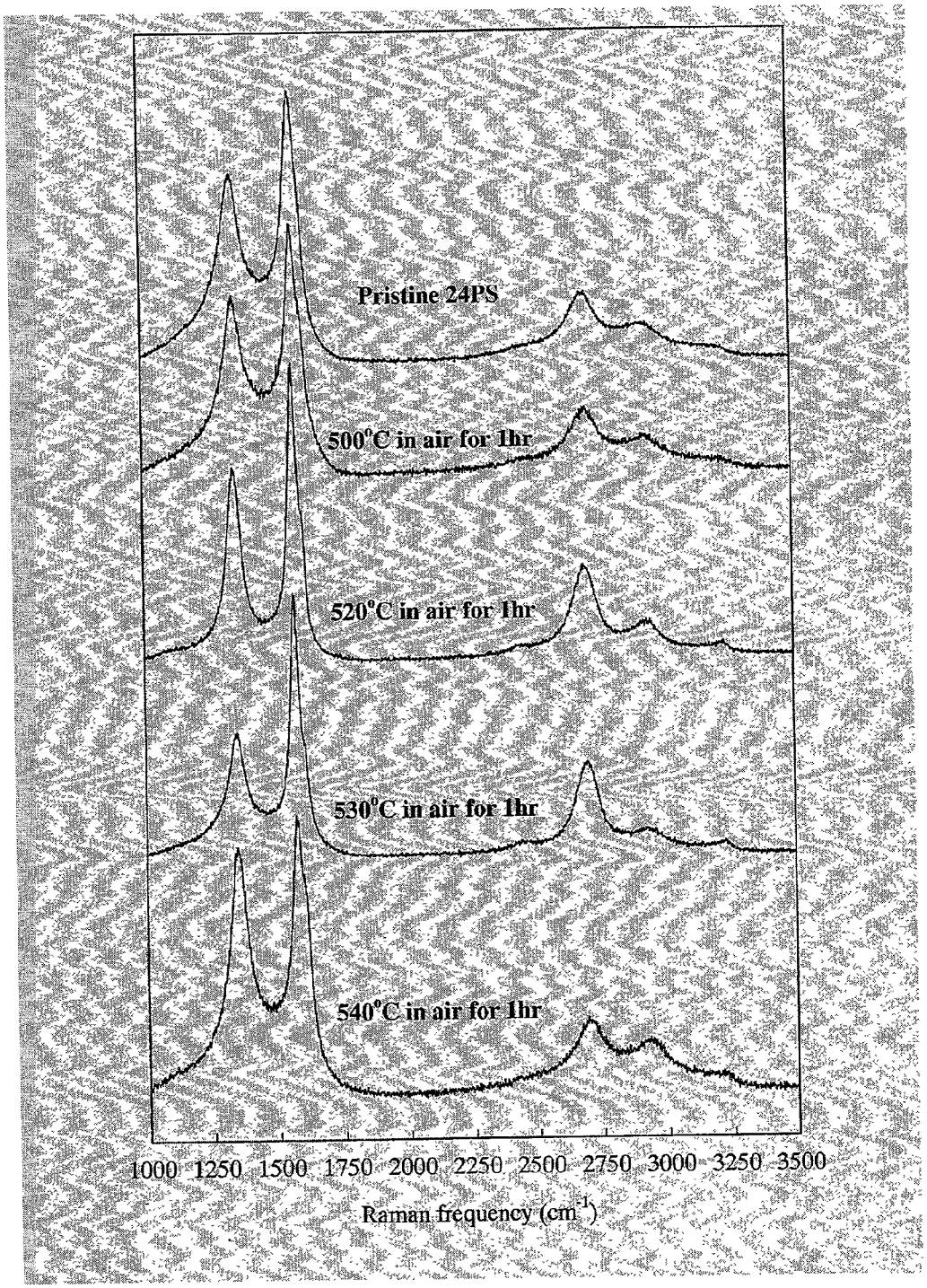
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of a D peak (1360 cm$^{-1}$) and a G peak (1580 cm$^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. This is one of the advantages. Specifically, atoms or the like are easily supported on the exposed edges of the hexagonal carbon layers having a high activity, since the substances are scarcely intercalated. Therefore, the carbon fiber is expected to function as an efficient support.

Figure 9:
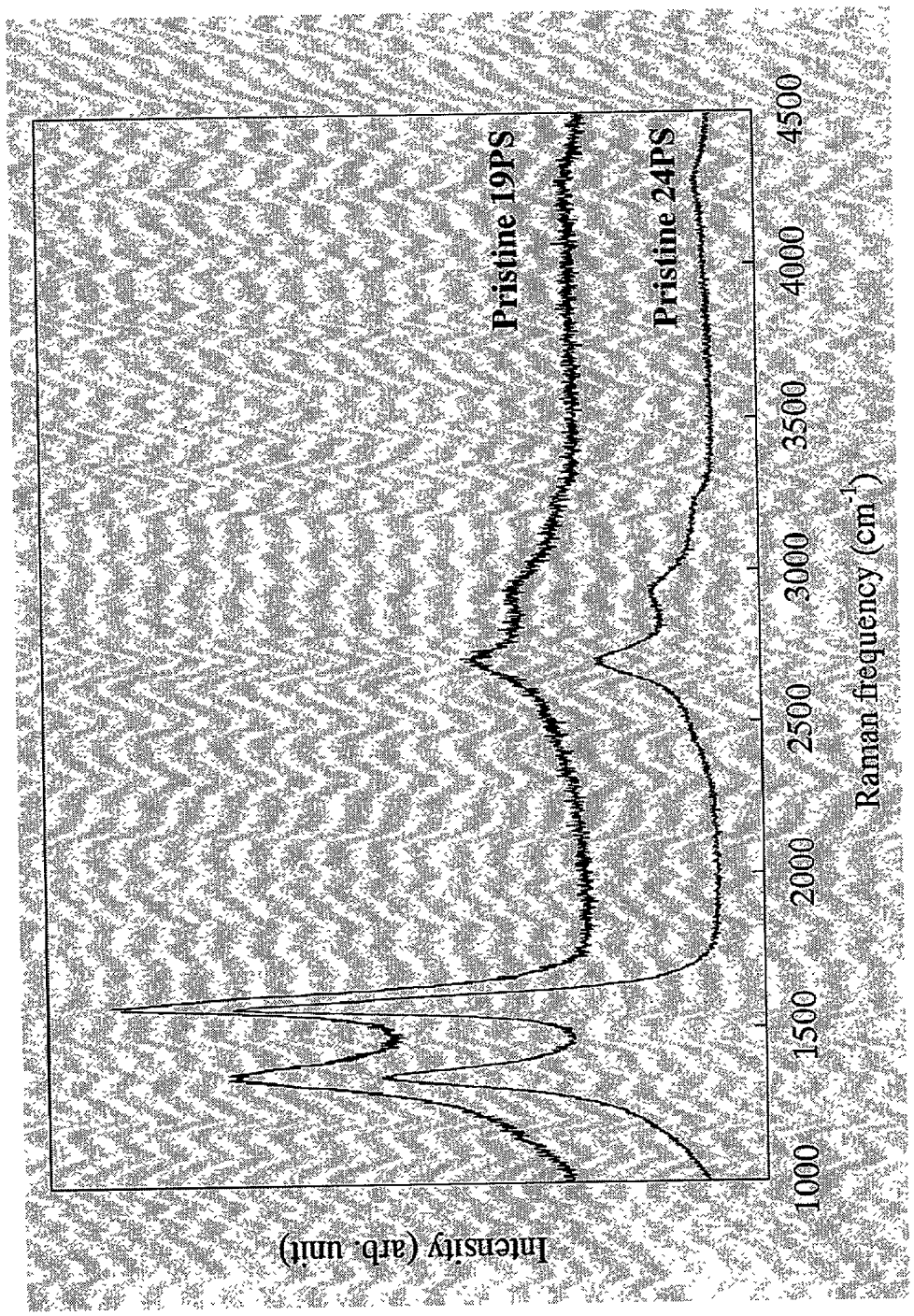
FIG. 9 is a characteristic chart showing the Raman spectra of carbon fiber samples No. 19PS and No. 24PS in which edges of hexagonal carbon layers are exposed by the heat treatment.

FIG. 9 shows the Raman spectra of carbon fiber samples No. 19PS and No. 24PS in which the edges of the hexagonal carbon layers are exposed by the above heat treatment.

Figure 10:
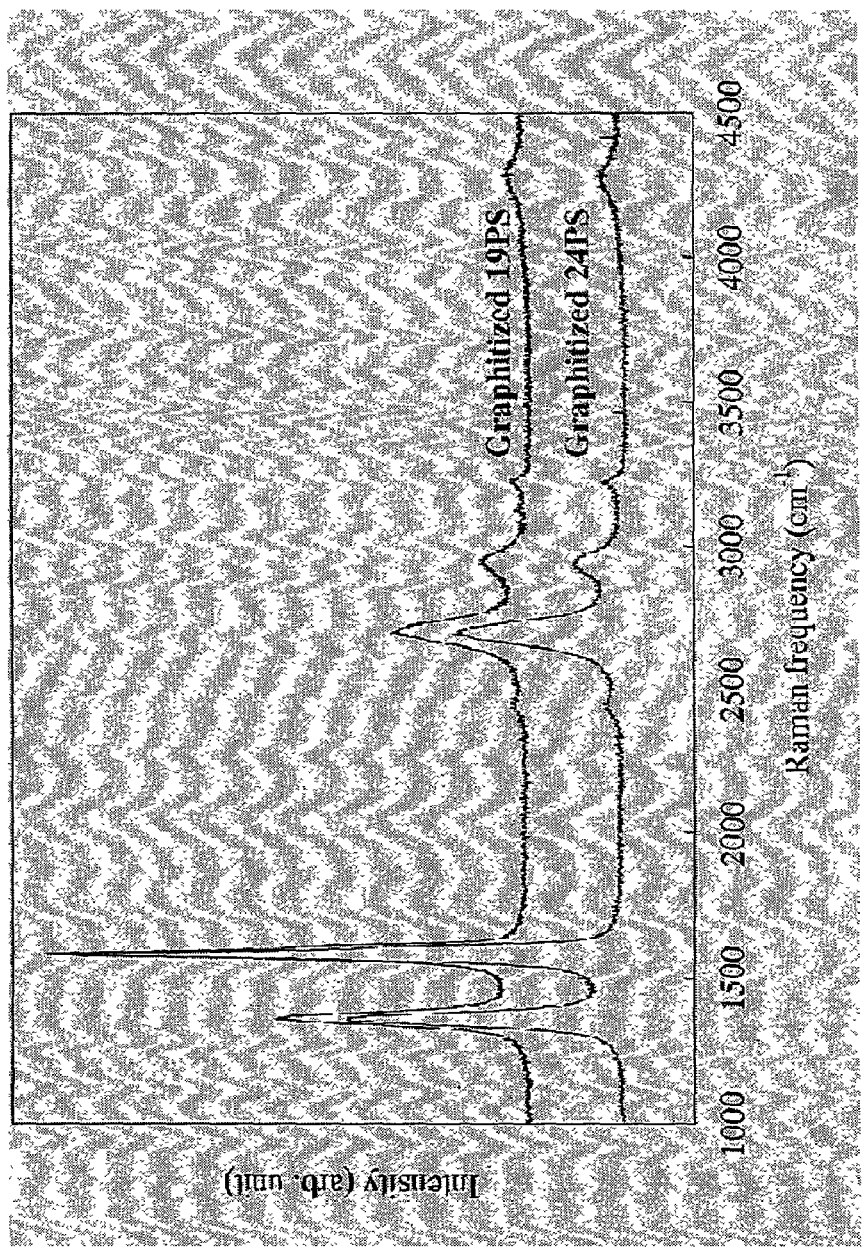
FIG. 10 is a characteristic chart showing the Raman spectra of the carbon fiber samples No. 19PS and No. 24PS heated at 3000° C. after the edges of the hexagonal carbon layers have been exposed.

FIG. 10 shows the Raman spectra of the carbon fiber samples No. 19PS and No. 24PS, in which the edges of the hexagonal carbon layers are exposed, after heating at 3000° C. (common graphitization treatment).

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The fact that the carbon fiber is not graphitized at a high temperature means that the carbon fiber is thermally stable.

The carbon fiber having the above basic structure can be suitably used as an electrode material for various types of batteries such as a lithium secondary battery, since the edges of the hexagonal carbon layers exposed at the large ring ends 20 and the small ring ends 22 have an extremely high activity.

Specifically, in the case of using the carbon fiber as an electrode material for a lithium secondary battery, lithium ions are easily adsorbed on the edges having a high activity. Therefore, the carbon fiber has the capability of storing a large amount of lithium ions, whereby the capacity of the battery can be increased. Moreover, an electrolyte is introduced into the center hole of the carbon fiber and held therein. This helps the capability of storing a large amount of lithium ions on the exposed edges inside the fiber, whereby the capacity of the battery can be increased.

Although the carbon fiber having the above basic structure is scarcely graphitized, the present inventors have found that a heat treatment causes the following interesting changes to occur in the carbon fiber.

Figure 11:
FIG. 11 is a copy of a transmission electron micrograph showing a state in which the edges of the hexagonal carbon layers are linked.
Figure 12:
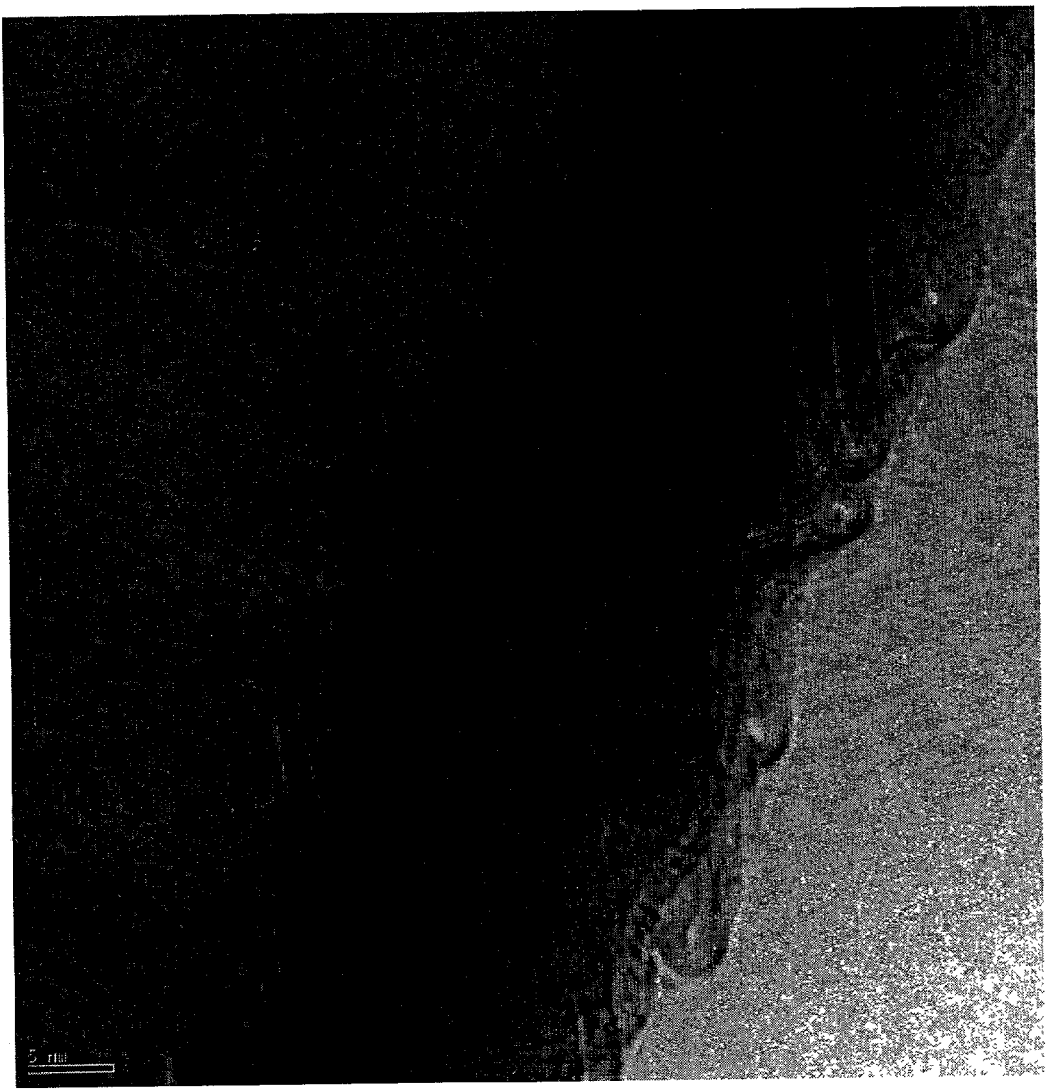
FIG. 12 is a copy of a transmission electron micrograph showing a state in which the edges of the hexagonal carbon layers are linked.
Figure 13:
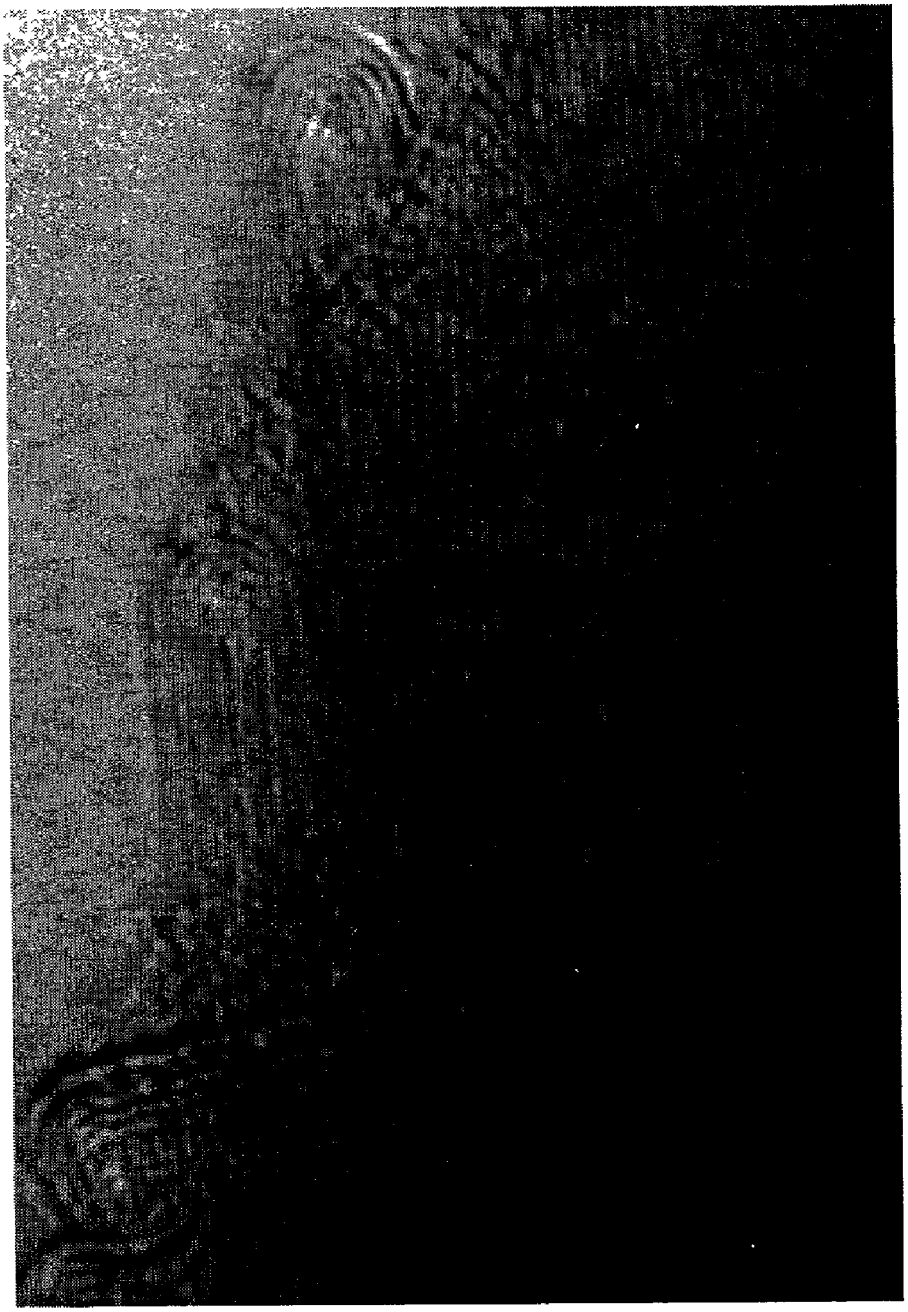
FIG. 13 is a copy of a transmission electron micrograph showing a state in which the edges of the hexagonal carbon layers are linked.

Specifically, the carbon fiber in which a large number of bottomless cup-shaped hexagonal carbon layers were stacked, in which the deposited layers were removed by a heat treatment at about 530° C., for example, was subjected to a heat treatment at about 3000° C. for five minutes or more in a non-oxidizing atmosphere (first heat treatment). As a result, the outer surface of the carbon fiber became a pinecone type or saw-toothed type surface, as shown in FIGS. 11, 12, and 13.

Figure 14:
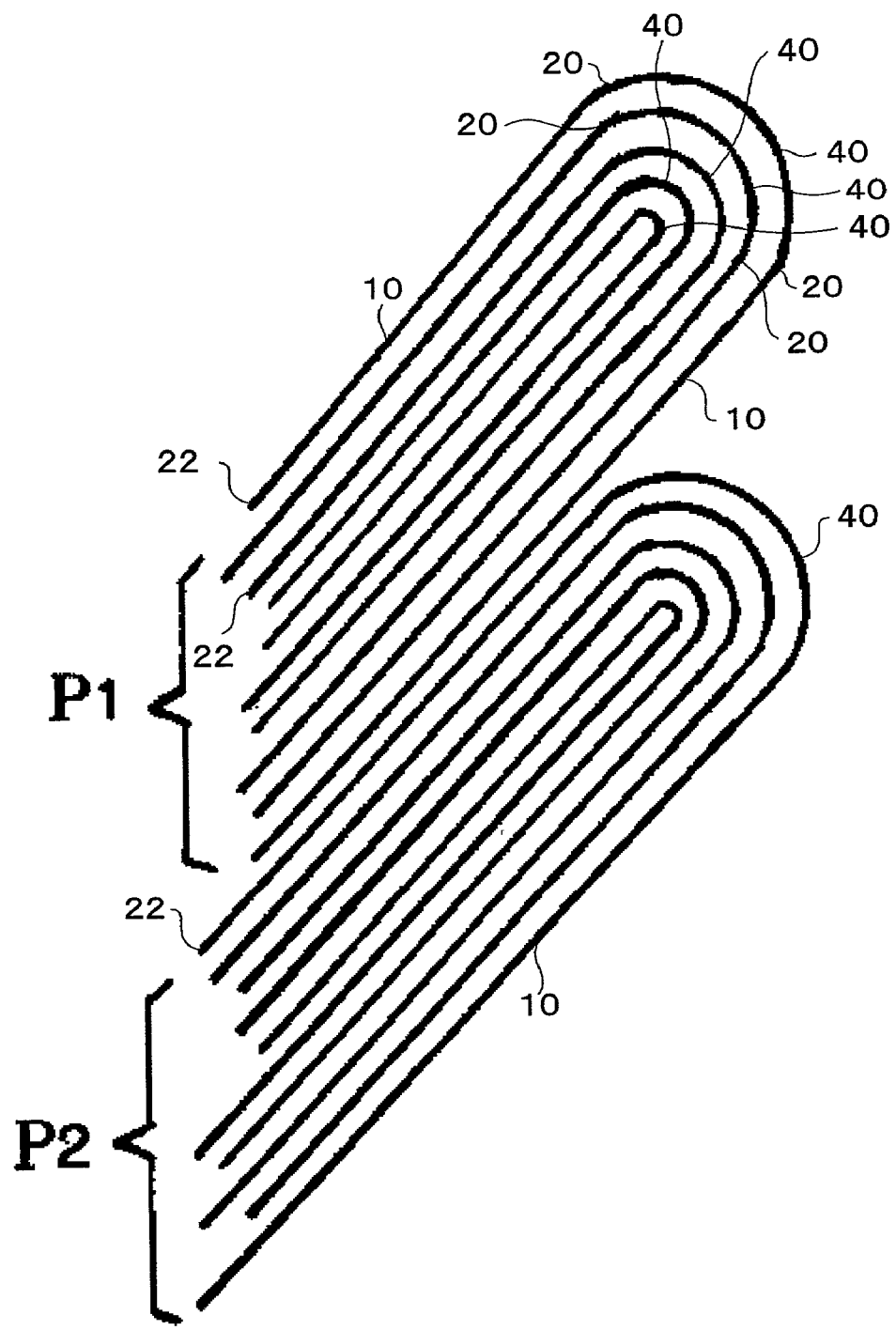
FIG. 14 is a schematic view showing a state in which the edges of the hexagonal carbon layers are linked.

FIG. 14 is a schematic view showing a state in which the large ring ends 20 of the hexagonal carbon layers are linked.

As shown in FIG. 14, in each group including a plurality of hexagonal carbon layers (P1 and P2 in FIG. 14), the large ring ends 20 of two hexagonal carbon layers in the innermost part of each group are linked in the shape of a semiring in cross section and closed. The large ring ends 20 of two hexagonal carbon layers on the outer side of the above two layers are linked in the shape of a semiring in cross section and closed. Further, the large ring ends 20 of two hexagonal carbon layers on the outer side of these two layers are linked in the shape of a semiring in cross section and closed. The large ring ends of the hexagonal carbon layers 10 are linked and closed successively in this manner. As a result, the large ring ends 20 of the hexagonal carbon layers 10 included in the groups P1 and P2 have layer link sections 40 having no edge, whereby the large ring ends 20 are closed and have a multi-semiring structure in cross section.

Although the mechanism by which the ring ends of two layers are linked and closed are unknown, it is interesting that the number of hexagonal carbon layers included in each group is about ten.

There was a tendency for the small ring ends 22 of the bottomless cup-shaped hexagonal carbon layers 10 to be closed by the first heat treatment.

The degree of losing between each layer may be adjusted by controlling the conditions of the first heat treatment such as time and temperature.

Therefore, the degree of activity of the edges of the hexagonal carbon layers can be adjusted.

This carbon fiber may be mixed with a resin or a metal to form a composite. In the case where the edges of the hexagonal carbon layers are exposed, the exposed edges have an extremely high activity and excel in adhesion to resins, and a composite having high strength can be obtained.

Various types of composites having different characteristics such as strength or flexibility can be formed by adjusting the degree of activity by linking and closing at least one of the large ring ends 20 and small ring ends 22 of the hexagonal carbon layers as described above.

The carbon fiber may be used as an electrode material for various types of batteries.

In the case of using the carbon fiber in which the edges of the hexagonal carbon layers are exposed as an electrode material for a lithium secondary battery (mainly an anode material), since the carbon fiber can store a large amount of lithium ions at the edges having a high activity, the capacity can be increased. In addition, controlling the degree of activity in the above manner enables adjustment of the capacity. In the case of using the carbon fiber as an electrode material for a lead storage battery or other types of batteries, an electrode material which is rarely eroded by an electrolyte can be obtained by closing the large ring ends 20 or the small ring ends 22 of the hexagonal carbon layers.

The present inventors have found that more interesting phenomena occur by subjecting the carbon fiber to a second heat treatment in an oxidizing atmosphere after the first heat treatment.

The second heat treatment is performed at a temperature of about 700° C. for about one hour in an oxidizing atmosphere, such as in air, for example.

The second heat treatment causes the large ring ends 20 or the small ring ends 22 of the hexagonal carbon layers 10, which are closed and have a multi-semiring structure in cross section by the first heat treatment, to be opened again and become edges in each of the groups P1 and P2.

As described above, in the carbon fiber in which the deposited layers 12 are removed, the outer surface and the inner surface on which the edges of the hexagonal carbon layers 10 are exposed have the minute irregularities 16 at a nanometer (nm) level, specifically, at a level of atoms due to irregularity of the edges, as shown in FIGS. 6 and 7. The cyclic edges of the hexagonal carbon layers do not form a complete circle, but form an irregular periphery in the circumferential direction.

The edges on which the hexagonal carbon layers are exposed have a high activity and have advantages such as capability of storing a large amount of lithium ions and the like.

However, the irregular edges cause the following problem.

Specifically, since the edges are irregular and the surface of the carbon fiber is finely split, intercalation of ions such as lithium ions or various types of gases between the hexagonal carbon layers is obstructed.

The large ring ends 20 or the small ring ends 22 of the hexagonal carbon layers are closed in the shape of a semiring in cross section by performing the first heat treatment to the carbon fiber. When the ring ends are closed in the shape of a semiring in cross section, the large ring ends 20 or the small ring ends 22 of the hexagonal carbon layers are restored and rearranged in an orderly manner. The layer link sections 40 which link two hexagonal carbon layers are considered to be formed in the shape of a semiring in cross section by including a pentagonal carbon layer, thereby closing the large ring ends 20 or the small ring ends 22 of two hexagonal carbon layers 10.

The layer link sections 40 including the pentagonal carbon layers have low physical and chemical strengths. These layer link sections 40 having a low strength are oxidized and decomposed by the second heat treatment. As a result, the large ring ends 20 or the small ring ends 22 of the hexagonal carbon layers 10 are opened again, whereby the edges are exposed.

Since the exposed edges of the hexagonal carbon layers 10 have been restored by the first heat treatment, irregularity of the edges of the hexagonal carbon layers 10 is eliminated, whereby the exposed edges are comparatively regularly arranged.

Since the exposed edges of the hexagonal carbon layers 10 are regularly arranged, the degree of activity of the edges is maintained. Moreover, intercalation or deintercalation of various types of ions such as lithium ions, gas, liquid, or the like between the hexagonal carbon layers 10 is improved. Therefore, the carbon fiber can be more suitably used as an electrode material for a lithium-ion secondary battery.

The carbon fiber can be used as a composite material which is mixed with a resin or a metal or used for other applications.

For example, the carbon fiber may be used for a field electron emitter by dispersing the carbon fibers in a dispersion medium such as an alcohol, depositing the carbon fibers on an electrode by spraying, and drying the carbon fibers to form a carbon fiber layer. In this case, the edges of the hexagonal carbon layers function as electron emission edges. Moreover, since the edges of the hexagonal carbon layers are regularly arranged, a large amount of discharge current can be obtained, whereby a necessary strong field can be obtained.

What is claimed is:

1. A carbon fiber comprising a coaxial stacking morphology of truncated conical tubular graphene layers,
    wherein each of the truncated conical tubular graphene layers includes a hexagonal carbon layer and has a large ring end at one end and a small ring end at the other end in an axial direction,
    wherein groups of the hexagonal carbon layers are arranged in the axial direction, and the large ring ends of each two of the hexagonal carbon layers are linked by layer link sections in at least one of the groups, whereby an outer surface is closed and has a multi-semiring structure in cross section.

2. The carbon fiber as defined in claim 1,
    wherein the number of the hexagonal carbon layers included in the one group is about ten.

3. The carbon fiber as defined in claim 1,
    wherein the layer link sections include pentagonal carbon layers.

4. The carbon fiber as defined in claim 1,
    wherein edges of the hexagonal carbon layers are exposed at the large ring ends in at least another one of the groups.

5. The carbon fiber as defined in claim 1,
wherein edges of the hexagonal carbon layers are exposed at the small ring ends in at least one of the groups.

6. The carbon fiber as defined in claim 1,
wherein the small ring ends of each two of the hexagonal carbon layers are linked by layer link sections in at least one of the groups, whereby an inner surface is closed and has a multi-semiring structure in cross section.

7. The carbon fiber as defined in claim 1,
wherein the coaxial stacking morphology of the truncated conical tubular graphene layers has a shape of a hollow core with no bridge.

8. An electrode material for battery comprising the carbon fiber as defined in claim 1.

* * * * *